United States Patent
Takei et al.

(10) Patent No.: US 8,167,270 B2
(45) Date of Patent: May 1, 2012

(54) VALVE GEAR WITH A BEARING HAVING A SLIDING SURFACE AGAINST A VALVE SHAFT

(75) Inventors: Mao Takei, Hyogo (JP); Toshinari Nishimura, Tokyo (JP); Takahiko Hirohata, Hyogo (JP); Masaya Kanikawa, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 346 days.

(21) Appl. No.: 12/309,029

(22) PCT Filed: Mar. 12, 2007

(86) PCT No.: PCT/JP2007/054803
§ 371 (c)(1),
(2), (4) Date: Apr. 30, 2009

(87) PCT Pub. No.: WO2008/111150
PCT Pub. Date: Sep. 18, 2008

(65) Prior Publication Data
US 2010/0006793 A1    Jan. 14, 2010

(51) Int. Cl.
*F16K 25/00* (2006.01)
(52) U.S. Cl. ........ 251/368; 384/280; 384/282; 384/912; 384/913
(58) Field of Classification Search .................. 251/368, 251/214; 219/73.21; 384/912, 913, 276, 384/280, 282
See application file for complete search history.

(56) References Cited

U.S. PATENT DOCUMENTS 3,071,678 A * 1/1963 Neely et al. ................ 219/76.16
(Continued)

FOREIGN PATENT DOCUMENTS

JP          59-169696          9/1984
(Continued)

OTHER PUBLICATIONS

Korean Office Action issued Feb. 17, 2011 in corresponding Korean Patent Application No. 10-2009-7000439 w/English translation.
(Continued)

*Primary Examiner* — John Fristoe, Jr.
*Assistant Examiner* — Marina Tietjen
(74) *Attorney, Agent, or Firm* — Wenderoth, Lind & Ponack, L.L.P.

(57) ABSTRACT

The invention improves reliability of a valve gear in which a cobalt-based alloy is welded by plasma power building up. The valve gear includes a bearing 2 having a sliding surface against a valve shaft 1. The valve gear having a welded layer 12 made of heat-resistant cobalt-based alloy, based on plasma powder building up, formed on the sliding surface against the valve shaft 1. The welded layer 12 includes a first welded layer 12a formed on the surface of the bearing 2, having a dilution ratio of 5 to 25% and a second welded layer 12b formed on the first welded layer 12a, having a dilution ratio of 50% or less of the dilution ratio of the first welded layer 12a. The dilution ratio indicates the penetration amount of the welding metal into the base metal, and is a value obtained by $B/A \times 100$ (%) wherein A represents the total amount of the welded metal and B represents the amount of the welding metal penetrating into the base metal.

4 Claims, 2 Drawing Sheets

U.S. PATENT DOCUMENTS

| | | | | |
|---|---|---|---|---|
| 3,271,553 A | * | 9/1966 | Johnson | 219/73.21 |
| 4,173,685 A | * | 11/1979 | Weatherly | 428/556 |
| 6,780,458 B2 | * | 8/2004 | Seth et al. | 427/201 |
| 7,172,821 B2 | * | 2/2007 | Sugiyama et al. | 428/628 |

FOREIGN PATENT DOCUMENTS

| | | | |
|---|---|---|---|
| JP | 60-17206 | | 1/1985 |
| JP | 62-254976 | * | 11/1987 |
| JP | 6-174126 | | 6/1994 |
| JP | 6-221105 | * | 8/1994 |

OTHER PUBLICATIONS

Korean Office Action issued Jun. 1, 2011 in corresponding Korean Patent Application No. 10-2009-7000439 w/English translation.

International Preliminary Report on Patentability and Written Opinion of the International Searching Authority issued Oct. 8, 2009 in International(PCT) Application No. PCT/JP2007/054803.

Chinese Office Action issued Dec. 21, 2010 in corresponding Chinese Patent Application No. 200780026067.0 w/English translation.

Chinese Office Action issued Jun. 2, 2011 in corresponding Chinese Patent Application No. 200780026067.0 w/English translation.

International Search Report mailed Jun. 12, 2007 for International Application No. PCT/JP2007/054803.

Japanese Office Action (with English Translation) issued Jul. 13, 2011 in corresponding Japanese Application No. 2009-503792.

Chinese Notice of Allowance (with English translation) issued Feb. 1, 2012 in corresponding Chinese Application No. 200780026067.0.

* cited by examiner

VALVE GEAR WITH A BEARING HAVING A SLIDING SURFACE AGAINST A VALVE SHAFT

TECHNICAL FIELD

The present invention relates to a valve gear, in particular, to a valve gear capable of preventing the sticking between the valve shaft of a steam valve and the bearing supporting the valve shaft.

BACKGROUND ART

A main steam valve in a steam turbine is used under harsh conditions of high temperature and high pressure, and further takes a task of controlling high-speed steam flow. Under high temperature, the surface of a metal is in an activated state to react with the high-temperature steam present in the atmosphere to produce an oxide film. The oxide film thus produced has different adhesion strength to the base metal, depending on the composition of the base metal and the atmospheric conditions, and undergoes delamination at every repeated opening-closing movement of the valve. The delaminated matter is deposited locally in the recessed portions of the valve shaft by the sliding of the valve shaft so as to fill in the clearance between the bearing and the valve shaft. Consequently, the sticking of the valve shaft is caused as the case may be. Accordingly, at the time of the periodic inspection of a steam turbine, it is necessary to conduct maintenance work for removing the oxide film by disassembling the members surrounding the valve shaft. Additionally, the generation amount of the deposition substance is anticipated, and accordingly the clearance between the valve shaft and the bearing is set at a sufficiently large value. Therefore, the steam amount leaking from the portion surrounding the valve shaft is increased to cause problems such as the decrease of the thermal efficiency of a whole plant.

As a method for solving the above-described problem, a surface-hardened layer based on nitriding has hitherto been provided on the outer surface of the valve shaft; however, the nitride layer is associated with a drawback that the nitride layer has characteristics of being decomposed and softened at about 500° C. or higher, and additionally, the thickness of the nitride layer is extremely thin, and hence the dissipation of the nitride layer leads to rapid development of abrasion.

As described above, even when an oxide film is produced, the valve shaft and the bearing are required to hold the clearance therebetween to such an extent that no disturbance is imposed on the operation of the valve. Additionally, such a valve shaft and such a bearing have been formed of a material such as a low-alloy steel (a Cr-Mo-V steel), 12 Cr stainless steel and an austenite stainless steel, and subjected to a surface-hardening treatment based on nitriding for the purpose of preventing abrasion, sticking and the like. The clearance between the valve shaft and the bearing provided to prevent sticking is set to be large with a surplus space, and hence there occurs a danger that the valve shaft is vibrated by the steam flow, the end of the bearing is abraded in a bell mouth shape and the vibration of the valve shaft is thereby further increased.

For the above-described problems, Patent Document 1 has proposed a valve gear in which building-up welding with a cobalt-based alloy is applied. In this valve gear, at least first two layers of the built-up layers are formed of a Co-based alloy (Stellite No. 25) composed of, in terms of weight, 9 to 11% of Ni, 19 to 21% of Cr, 14 to 16% of W, 0.05 to 0.15% of C, a small amount of Fe and impurities and the balance composed of Co, and an additional layer on top of these layers is formed of a Co-based alloy (Stellite No. 6) composed of, in terms of weight, 3 to 6% of Ni, 26 to 32% of Cr, 0.9 to 1.4% of C, 3 to 6% of W. a small amount of Fe and impurities and the balance composed of Co or a Co-based alloy (Stellite No. 21) composed of, in terms of weight, 4% or less of Ni, 25 to 29% of Cr, 0.2 to 0.3% of C, 5 to 6% of Mo, a small amount of Fe and impurities and the balance composed of Co. It is to be noted that Stellite is a registered trade name of Deloro Stellite Company Patent Document 1 has presented an example of the use of TIG welding as building-up welding, and on the other hand, Patent Document 2 has proposed a formation of a welded layer of a Co-based alloy on the outer surface of the valve shaft in contact with the bearing by means of plasma powder building-up welding.

Patent Document 3 has also proposed: a formation of a cladding hardened layer on the contacting-to-bearing surface of a valve shaft constituting a driving unit of a steam valve, by continuously feeding a cobalt-based hard alloy powder, and irradiating the powder with a laser beam to successively melt the powder to form a cladding hardened layer; and a formation of a cladding hardened layer on the contacting-to-bearing surface of a valve shaft constituting a driving unit of a steam valve, by thermally spraying or applying a cobalt-based hard alloy powder onto the contacting-to-bearing surface to form a hard alloy layer, and by thereafter irradiating the thus formed hard alloy layer with a laser beam to melt the hard alloy layer again to form the cladding hardened layer.

Patent Document 1 and Patent Document 2 both disclose the reduction of the oxide film generation by use of Co-based alloys, typically Stellites.

Patent Document 1: Japanese Patent Laid-Open No. 59-169696

Patent Document 2: Japanese Patent Laid-Open No. 60-17206

Patent Document 3: Japanese Patent Laid-Open No. 6-174126

DISCLOSURE OF THE INVENTION

Problems to be Solved by the Invention

The plasma powder building-up welding proposed by Patent Document 2 is small in the penetration depth of the welding material into the base metal and enables to set the dilution ratio at a value as small as less than 5%, and accordingly has an advantage that the built-up layer of the welding material having a standard chemical composition can be efficiently obtained. On the other hand, the laser beam welding proposed by Patent Document 3 has a problem that an assist gas for cooling is made to flow around the beam, hence the building-up material is scattered by the gas, and consequently the welding efficiency is low. Therefore, implementation of the plasma powder building-up welding of a cobalt-based alloy is effective for the valve gear as a target of the present invention.

However, the present inventors performed various experiments of plasma powder building-up welding of a cobalt-based alloy, and consequently verified that when the plasma powder building-up welded layer made of the cobalt-based alloy is allowed to stand for a long period of time under harsh conditions of high temperature and high pressure, the welded layer is delaminated or brittle cracking is generated in the welded layer.

It was also verified that when building-up welding is applied to the valve shaft, at the time of occurrence of trip or urgent load interruption, the valve shaft undergoes a large impact as the case may be, and the welding portion of the valve shaft tends to undergo brittle fracture.

The present invention was achieved on the basis of the technical problems as described above, and takes as its object the improvement of the reliability of the valve gear in which a cobalt-based alloy is welded by plasma powder building-up welding.

Means for Solving the Problems

For the purpose of achieving such an object as described above, the present inventors investigated the cause for the fact that the plasma powder building-up welded layer made of a cobalt-based alloy is delaminated or brittle cracking is generated in the welded layer, and consequently found that the dilution ratio of the cobalt-based alloy in relation to the base metal is involved. As described above, the plasma powder building-up welding is characterized in that the dilution ratio can be made as small as less than 5%. However, when the dilution ratio is as small as less than 5%, the delamination tends to occur. On the other hand, when the dilution ratio is increased, the tendency of generating brittle cracking in the welded layer is high. Accordingly, the present invention proposes a formation of a plasma powder building-up welded layer made of a cobalt-based alloy with the dilution ratio controlled so as to fall within a specific range.

From the view point of safety, the present invention proposes to apply a building-up welding of a cobalt-based alloy to the bearings in the valve gears in an electricity-generating system based on steam turbines or the like, such a system being required to attach importance to safety to a relatively higher degree.

Specifically, the present invention is a valve gear comprising a bearing having a sliding surface against a valve shaft, the valve gear being characterized in that: the bearing has a plasma powder building-up welded layer made of a heat-resistant cobalt-based alloy on the sliding surface against the valve shaft; and the welded layer comprises a first welded layer formed on the surface of the bearing, having a dilution ratio of 5 to 25% and a second welded layer formed on the first welded layer, having a dilution ratio of 50% or less of the dilution ratio of the first welded layer.

The dilution ratio of the first welded layer is preferably 10 to 25%.

It is to be noted that the dilution ratio in the present invention is a parameter indicating the penetration amount of the welding metal into the base metal, and means a value obtained by $B/A \times 100$ (%) wherein A represents the total amount of the welded metal and B represents the amount of the welding metal penetrating into the base metal.

ADVANTAGES OF THE INVENTION

As described above, according to the valve gear of the present invention, by forming a plasma powder building-up welded layer made of a cobalt-based alloy with a dilution ratio controlled so as to fall within a specific range, even when the valve gear is allowed to stand for a long period of time under harsh conditions of high temperature and high pressure, it is possible to prevent the delamination of the plasma powder building-up welded layer made of a cobalt-based alloy, or to prevent the generation of brittle cracking in the welded layer, and to improve the reliability of the valve gear in which a cobalt-based alloy is welded by plasma powder building-up welding.

Additionally, according to the valve gear of the present invention comprising a valve shaft and a bearing supporting the valve shaft, the cobalt-based alloys each having a small coefficient of friction slide on each other, and hence this fact, in addition to the above-described effect, enables a lower torque to perform the opening-closing of the valve. Therefore, the present invention attains an advantage that an actuator for opening-closing of a valve can be reduced in size.

BEST MODE FOR CARRYING OUT THE INVENTION

Hereinafter, the present invention is described in detail, on the basis of an embodiment illustrated in the accompanying drawings.

FIG. 1 is a schematic view illustrating the condition in which a valve shaft 1 is fitted into a bearing 2 in the present embodiment.

The nearly columnar valve shaft 1 comprises a base metal 11 and a welded layer 12 formed on the outer surface of the base metal 11. The hollow nearly-cylindrical bearing 2 also comprises a base metal 21 and a welded layer 22 formed on an inner peripheral surface of the base metal 21. The welded layer 12 of the valve shaft 1 and the welded layer 22 of the bearing 2 each serve as a sliding surface.

The base metal 11 of the valve shaft 1 and the base metal 21 of the bearing 2 can be made of a low-alloy steel (a Cr-Mo-V steel), 12 Cr stainless steel, an austenite stainless steel or the like.

The welded layer 12 of the valve shaft 1 and the welded layer 22 of the bearing 2 are obtained by plasma powder building-up welding of a cobalt-based alloy. As the cobalt-based alloy, Stellite can be used. Stellite includes several different types as shown in Table 1. The present invention can use any of such different types. As the Co-based alloy, Tribaloy (registered trade name of Deloro Stellite Company) can also be used. Tribaloy also includes several different types as shown in Table 1, and the present invention can use any of such different types. These alloys have a commonality in that any of these alloys includes a considerable amount of Cr. It is to be noted that Table 1 shows the representative components in terms of percent by weight.

TABLE 1

| Name | Cr | C | Mo | Si | W | Ni | Co | Fe | Others |
|---|---|---|---|---|---|---|---|---|---|
| Stellite 1 | 30 | 2.5 | | | 12 | | Bal. | | |
| Stellite 6 | 28 | 1.1 | | | 4 | | Bal. | | |
| Stellite 12 | 29-31 | 1.4-1.8 | | | 8 | | Bal. | | |
| Stellite 20 | 33 | 2.45 | | 1 | 17.5 | | Bal. | <2.5 | |
| Stellite 21 | 27 | 0.25 | 6 | | | 2 | Bal. | | |
| Stellite 22 | 28 | 0.3 | 12 | | | 1.5 | Bal. | | |
| Stellite 25 | 20 | 0.1 | | | 15 | 10 | Bal. | <3.0 | |

TABLE 1-continued

| Name | Cr | C | Mo | Si | W | Ni | Co | Fe | Others |
|---|---|---|---|---|---|---|---|---|---|
| Stellite 31 | 25.5 | 0.5 | | | 7.5 | 10.5 | Bal. | | |
| Stellite 190 | 26 | 3.25 | 1 | 0.85 | 14.5 | 3 | Bal. | 3 | |
| Stellite 250 | 28 | 0.1 | | | | | Bal. | 20 | |
| Stellite 306 | 24 | 0.5 | | 1 | 3 | 5 | Bal. | <7.0 | Nb 5.0 |
| Stellite 694 | 28 | 1 | | 1 | 19 | | Bal. | <2.5 | |
| Stellite 706 | 29 | 1.2 | 5 | <2.0 | | <3.0 | Bal. | <3.0 | |
| Stellite 712 | 29 | 1.85 | 9 | 0.5 | | <3.0 | Bal. | <3.0 | |
| Stellite F | 25 | 1.7 | | | 12 | 22 | Bal. | | |
| Tribaloy T-400 | 8.5 | <0.08 | 28.5 | 2.6 | | | Bal. | | Ni + Fe <3.0 |
| Tribaloy T-400 C | 14 | <0.08 | 27 | 2.4 | | | Bal. | | |
| Tribaloy T-800 | 18 | <0.08 | 28 | 3.4 | | | Bal. | | |
| Tribaloy T-900 | 18 | <0.08 | 23 | 2.7 | | 16 | Bal. | | |

The welded layer 12 of the valve shaft 1 and the welded layer 22 of the bearing 2 are formed by plasma powder building-up welding. The plasma powder building-up welding is a method in which a powdery welding metal is fed in a plasma arc generated between a plasma welding torch and a welding base metal, and thus, the powdery welding metal is melted and built up. As described above, the plasma powder building-up welding is characterized in that a built-up layer having a low dilution ratio is obtained. However, the present invention does not take advantage of the characteristic of being low in dilution ratio, but welded layers each having a dilution ratio set at a higher value than usual are disposed.

As shown in FIG. 2, the welded layer 12 of the valve shaft 1 is composed of a first welded layer 12a in contact with the base metal 11 and a second welded layer 12b formed on the first welded layer 12a. In other words, by applying plasma powder building-up welding to the base metal 11, the first welded layer 12a is formed. The first welded layer 12a is formed, the surface of the first welded layer 12a is subjected to grinding and polishing processing, and then by applying plasma powder building-up welding to the top of the first welded layer 12a, the second welded layer 12b is formed. After the second welded layer 12b is formed, the surface of the second welded layer 12b is subjected to grinding and polishing processing, and thus the welded layer 12 is obtained. The first welded layer 12a and the second welded layer 12b are usually made of one and the same welding metal.

In the valve shaft 1 according to the present embodiment, the dilution ratio of the first welded layer 12a is set at 5 to 25%.

This is because when the dilution ratio of the first welded layer 12a is less than 5%, under the use environment of the valve shaft 1, the welded layer 12 tends to undergo delamination in the interface between the base metal 11 and the first welded layer 12a. It may be interpreted that this is because when the dilution ratio is low, welding defects such as incomplete fusion occurs between the base metal 11 and the first welded layer 12a to decrease the adhesion strength of the first welded layer 12a in relation to the base metal 11. In a practical welding process, in consideration of the local fluctuation of the dilution ratio, it is preferable to control the lower limit of the dilution ratio so as to be 10%.

On the other hand, when the dilution ratio of the first welded layer 12a exceeds 25%, cracking tends to occur in the first welded layer 12a under the use environment of the valve shaft 1. The preferable dilution ratio is 15 to 25% and the more preferable dilution ratio is 17 to 23%. The reasons for the occurrence of the cracking when the dilution ratio is high are as follows. When the dilution ratio is high, the Fe component in the base metal 11 penetrates much into the first welded layer 12a. By combination of such Fe and the Cr component contained in the above-described Co-based alloy, there is induced a condition that the σ phase tends to be precipitated. The σ phase as referred to herein means an intermetallic compound between Fe and Cr, which is extremely hard and has a characteristic of being brittle. By maintaining the first welded layer 12a, into which the Fe component penetrates much, for a long time at a high temperature, the σ phase is precipitated into the first welded layer 12a and thus cracking tends to occur. Additionally, after the plasma powder building-up welding, in the course of the cooling of the first welded layer 12a down to normal temperature, a tensile residual stress is generated in the first welded layer 12a. This residual stress tends to be increased with the increase of the dilution ratio. On the other hand, by the operation of the valve shaft 1, an external force is exerted on the first welded layer 12a. When the sum of the external force and the residual stress exceed the breakdown strength of the first welded layer 12a, the cracking is generated.

Next, the second welded layer 12b is made of the same welding metal as used in the first welded layer 12a. Therefore, the second welded layer 12b can acquire a high adhesion strength in relation to the first welded layer 12a. Because such a high adhesion strength can be acquired, the second welded layer 12b allows a relatively low dilution ratio, and may have a dilution ratio of 50% or less of the dilution ratio of the first welded layer 12a. More specifically, the dilution ratio of the second welded layer 12b may be less than 5% and further may be less than 3%. It is to be noted that the dilution ratio of the second welded layer 12b is derived by taking as the base metal the first welded layer 12a.

The dilution ratio of the first welded layer 12a (the second welded layer 12b) can be controlled by the conditions of the plasma powder building-up welding. For example, when above-described Stellite or Tribaloy is adopted as the welding metal, the dilution ratio of the first welded layer 12a can be made to be 5 to 25% by adopting the following conditions.

Preheating temperature of base metal 11: 250 to 350° C.
Welding speed: 70 to 80 mm/min
Assist gas: Ar gas (temperature: 20° C.)
Gas flow rates: plasma gas: 2 to 3 l/min; shielding gas: 10 to 15 l/min
Separation between torch and welded part: 5 to 10 mm
Torch temperature: 90 to 120° C.
Welding metal particle size distribution: 60 to 180 μm The above-described welding conditions are characterized in that the welding speed is set to be slow. This is for the purpose of obtaining a dilution ratio of 5 to 25% which is rather high for plasma powder building-up welding. In other words, by slowing down the welding speed, the time during which the welding metal is kept in a liquid phase is elongated to increase the dilution ratio. By increasing the time during which the welding metal is kept in a liquid phase, also offered is an advantage that the rippling of the welded surface is reduced, and the first welded layer 12a having a flat and smooth surface can be obtained.

The second welded layer 12b is lower in dilution ratio than the first welded layer 12a. Therefore, in formation of the second welded layer 12b, the same apparatus as used for the first welded layer 12a is used, and when thickness of the building-up welded layer of the second welded layer 12b is the same as that of the first welded layer 12a, the welding speed may be made faster within the range from 70 to 100 mm/min as compared to the case where the first welded layer 12a is formed. The other welding conditions may be made the same as in the first welded layer 12a.

The thickness of the first welded layer 12a and the thickness of the second welded layer 12b are to be appropriately determined according to the use environment; however, the thickness of each of these welded layers is preferably set at about 1.5 to 2.0 mm. When the welded layer 12 made of a single layer of 3 to 4 mm is intended to be obtained, welding by an expert is required in order to perform building-up to provide a uniform thickness by suppressing the height of the weld bead wave also for the purpose of alleviating the time and labor required for the grinding and polishing processing to be subsequently performed. However, when the thickness of each of the first welded layer 12a and the second welded layer 12b is relatively as thin as about 1.5 to 2.0 mm, welding even by using a robot can provide a welded surface being flat and smooth. Further, because the welding metal of the first welded layer 12a is the same as the welding metal of the second welded layer 12b, the thickness of each of these welded layers can be made as thin as about 1.5 to 2.0 mm. Therefore, the gas entrainment during welding is small in amount, and hence the generation of pores to be a cause for the retention of foreign matter due to grinding can be reduced.

Hereinabove, the welded layer 12 of the valve shaft 1 is described; also for the welded layer 22 of the bearing 2, a first welded layer and a second welded layer having the same forms are provided.

The cobalt-based alloy is small in the coefficient of dry friction and generates no scales, and hence is stable in the coefficient of friction. In particular, the coefficient of dry friction between two pieces of a cobalt-based alloy is as higher as 0.56 as compared to the coefficient of friction between a cobalt-based alloy and an Fe-based alloy that amounts to 0.41. However, absolutely no generation of scales occurs and high-temperature steam is interposed, and hence the coefficient of friction between the two pieces of the cobalt-based alloy is substantially lower than in dry conditions and stable. Accordingly, disposition of a cobalt-based alloy on each of the sliding surface of the valve shaft 1 and the sliding surface of the bearing 2 enables a lower torque to perform the opening-closing of the valve. Therefore, the present invention also attains an advantage that an actuator for opening-closing of a valve can be reduced in size.

EXAMPLE

A 1.2% Cr-0.3% Mo steel (JIS SCM3) was prepared. To the plate-shaped steel material (base metal), plasma powder building-up welding was conducted in the following manner. In the plasma powder building-up welding, two layers were formed as shown in FIG. 2, and the dilution ratio was varied from layer to layer. As shown in Table 2, the dilution ratio was regulated by varying the welding speed. In FIG. 2, a first welded layer is a layer formed on the surface of the base metal, and the second welded layer is a layer formed on the surface of the first welded layer. After the first welded layer was formed, the surface of the first welded layer was subjected to grinding and polishing processing to attain a thickness shown in Table 2. Thereafter, after the second welded layer was formed, the surface of the second welded layer was subjected to grinding and polishing processing to attain a thickness shown in Table 2.

Preheating temperature of steel material: 300° C.

Welding speed: 60 to 80 mm/min

Assist gas: Ar gas (temperature: 20° C.)

Gas flow rates: plasma gas: 2.5 l/min; shielding gas: 12 l/min

Separation between torch and welded part: 6 mm

Torch temperature: 90 to 120° C.

Welding metal material: 55% Co-30% Cr-15% W (% by weight)

Welding metal particle size distribution: 120 μm (mean particle size)

By using the sample prepared in the above-described manner, the delamination and the cracking of the welded layer were evaluated.

The evaluation of the delamination was performed by means of ultrasonic flaw inspection. The evaluation of the cracking was performed by means of fluorescent-penetrant flaw inspection.

The results thus obtained are shown in Table 2. When the dilution ratio of the first welded layer was less than 5%, delamination of the first welded layer from the base metal was observed. However, when the dilution ratio of the second welded layer was less than 5%, there were no cases where the second welded layer was delaminated from the first welded layer.

When the dilution ratio of the first welded layer exceeded 25%, cracking was observed in the first welded layer. Similarly, when the dilution ratio of the second welded layer exceeded 25%, cracking was observed in the second welded layer.

From the above-described results, it is preferable to set the dilution ratio of the first welded layer, based on plasma powder building-up welding, in contact with the base metal to fall within a range from 5 to 25%. Additionally, the dilution ratio of the second welded layer formed on the first welded layer is set at 5% or less and preferably 3% or less, for the purpose of bringing out the intrinsic properties of the cobalt-based alloy forming the second welded layer.

TABLE 2

| First welded layer | | | Second welded layer | | | | |
|---|---|---|---|---|---|---|---|
| Thickness (mm) | Dilution ratio (%) | Welding speed (mm/min) | Thickness (mm) | Dilution ratio (%) | Welding speed (mm/min) | Delamination | Cracking |
| 2 | 3 | 85 | 1.5 | 3 | 81 | First welded layer | None |
| 2 | 5 | 80 | 1.5 | 2.5 | 81 | None | None |
| 2 | 15 | 73 | 1.5 | 3 | 81 | None | None |
| 2 | 20 | 66 | 1.5 | 3 | 81 | None | None |
| 2 | 25 | 60 | 1.5 | 3 | 81 | None | None |
| 2 | 30 | 53 | 1.5 | 3 | 81 | None | First welded layer |
| 2 | 35 | 46 | 1.5 | 3 | 81 | None | First welded layer |
| 1.5 | 20 | 66 | 2 | 5 | 75 | None | None |
| 1.5 | 20 | 66 | 2 | 9 | 58 | None | None |
| 1.5 | 20 | 66 | 2 | 9 | 49 | None | None |
| 1.5 | 20 | 66 | 2 | 30 | 42 | None | First and second welded layers |
| 1.5 | 20 | 66 | 2 | 35 | 40 | None | First and second welded layers |

DESCRIPTION OF SYMBOLS

Figure 1:
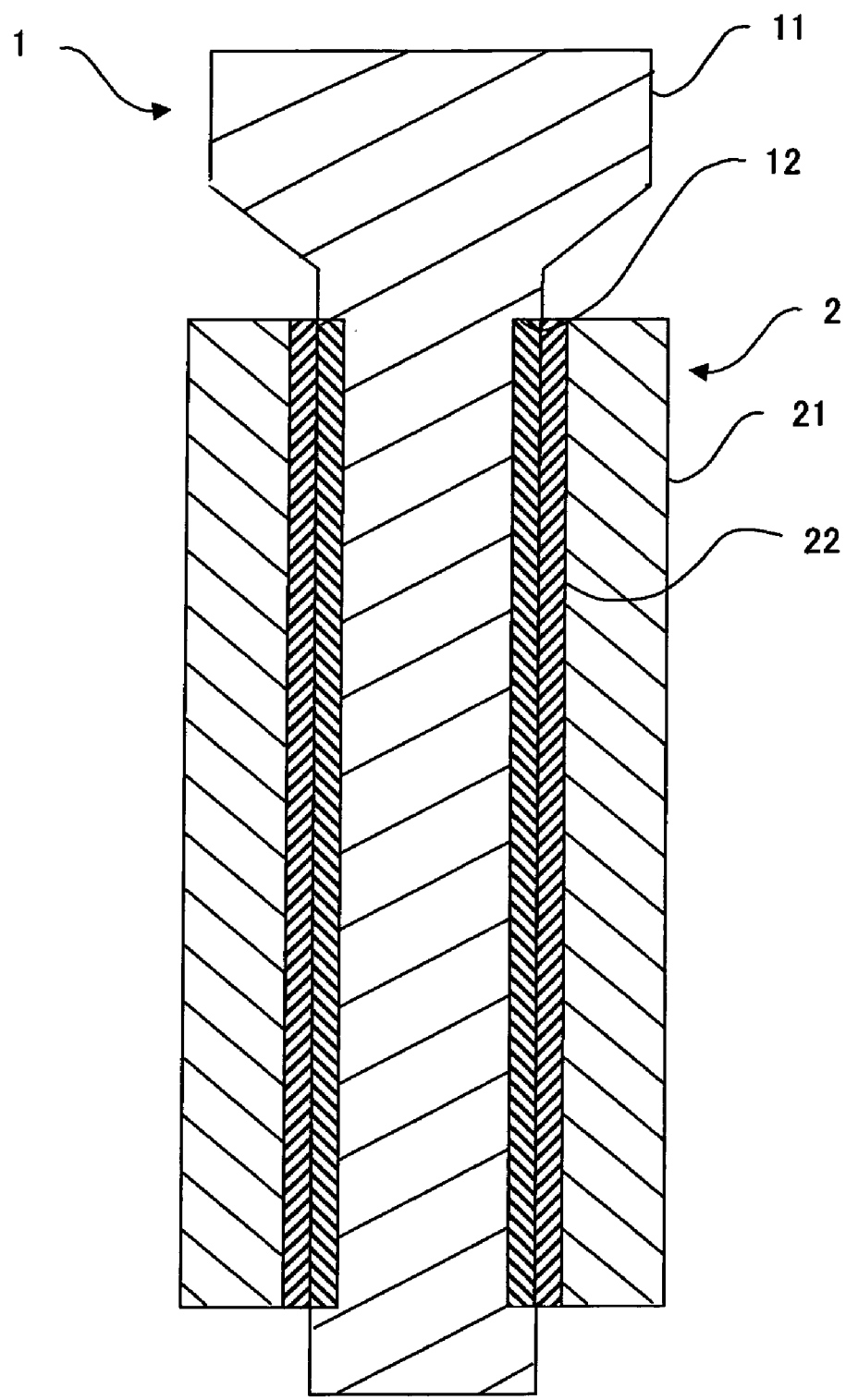
FIG. 1 is a sectional view illustrating a valve shaft and a bearing in an embodiment.
Figure 2:
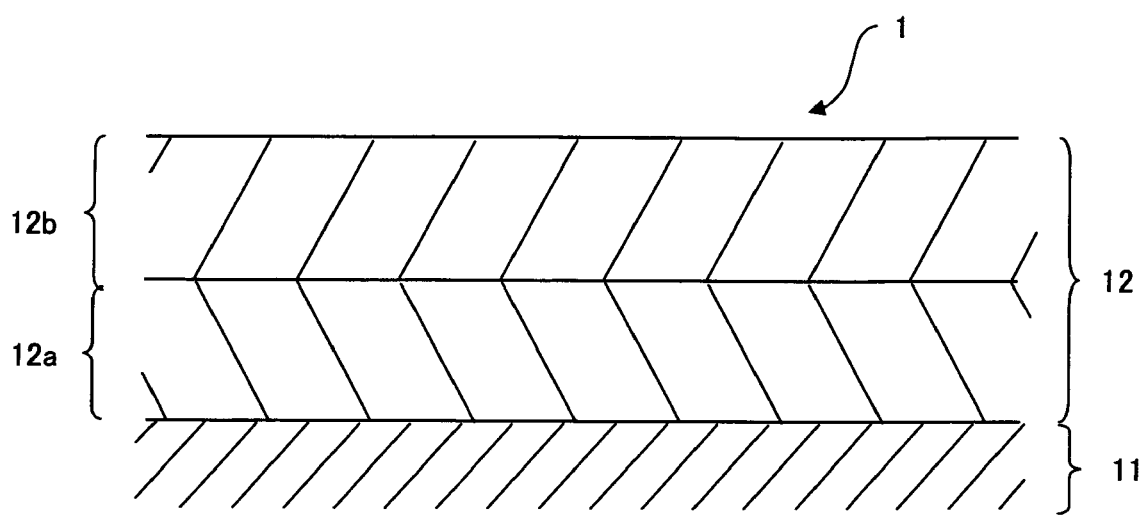
FIG. 2 is a view schematically illustrating the structure of the welded layer on the surface of the valve shaft.

1: Valve shaft, 11: Base metal, 12: Welded layer, 12*a*: First welded layer, 12*b*: Second welded layer, 2: Bearing, 21: Base metal, 22: Welded layer

The invention claimed is:

1. A valve gear comprising a bearing having a sliding surface against a valve shaft, wherein:
    the bearing has a plasma powder building-up welded layer (X) made of a heat-resistant cobalt-based alloy on the sliding surface against the valve shaft;
    the valve shaft has a plasma powder building-up welded layer (Y) made of a heat-resistant cobalt-based alloy on a sliding surface thereof against the bearing;
    the welded layer (X) formed on the bearing comprises:
        a first welded layer formed on the surface of the bearing, having a dilution ratio of 15 to 25%; and
        a second welded layer formed on the first welded layer, having a dilution ratio of 50% or less of the dilution ratio of the first welded layer; and
    the welded layer (Y) formed on the valve shaft comprises:
        a third welded layer formed on the surface of the valve shaft, having a dilution ratio of 15 to 25%; and
        a fourth welded layer formed on the third welded layer, having a dilution ratio of 50% or less of the dilution ratio of the third welded layer.

2. The valve gear according to claim 1, wherein:
the dilution ratio of the first welded layer is 17 to 25%.

3. The valve gear according to claim 1, wherein:
the dilution ratio of the third welded layer is 17 to 25%.

4. The valve gear according to claim 1, wherein:
thicknesses of the third welded layer and the fourth welded layer are individually 1.5 to 2.0 mm.

* * * * *